A. Rank.
Mower.
No. 3,627. Reissued Aug. 31, 1869.
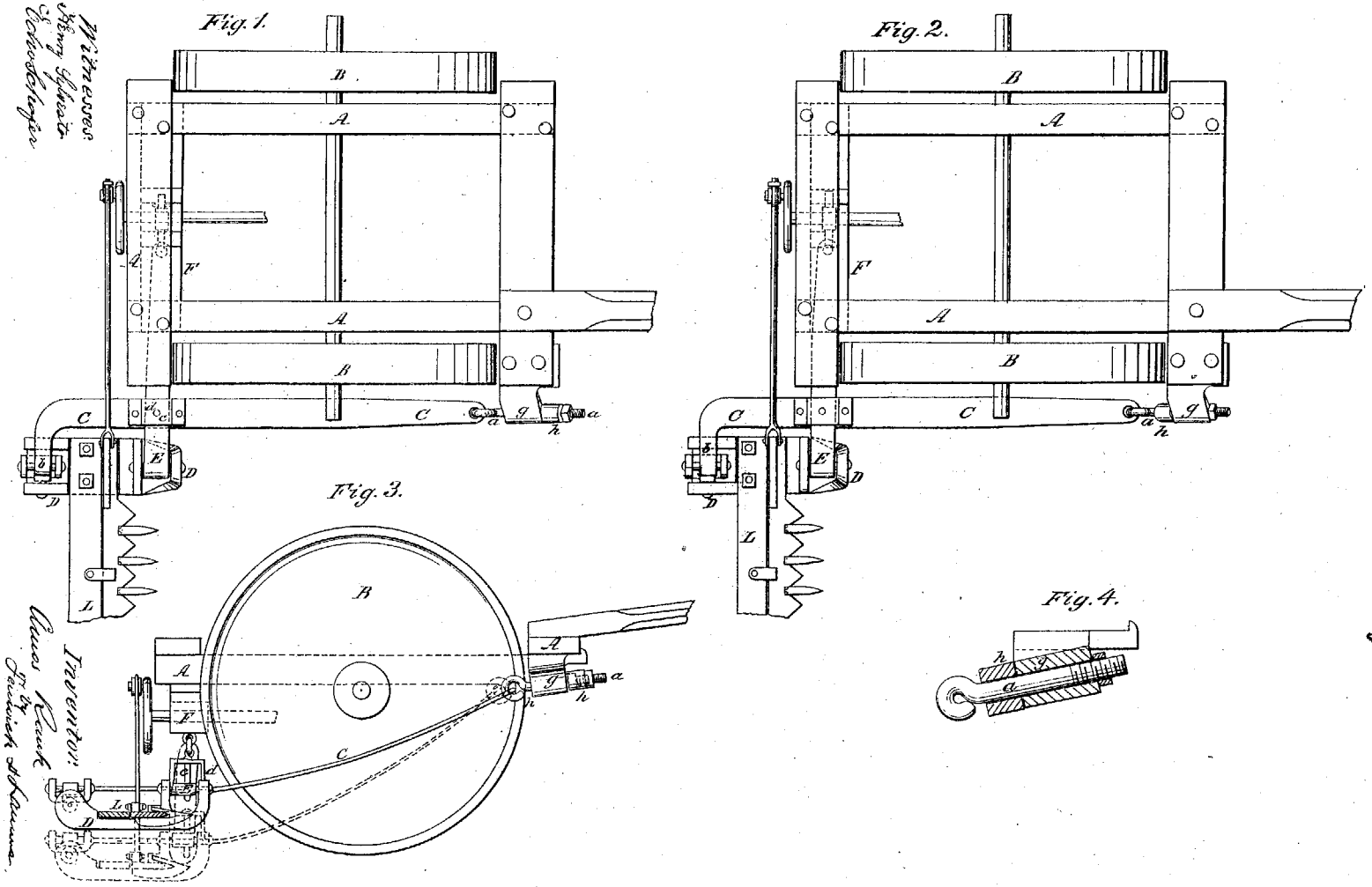
Witnesses:
Henry Sylvester
Echo Schroeder
Inventor:
Amos Rank
by
Fenwick & Lemma
N. PETERS, PHOTO-LITHOGRAPHER, WASHINGTON, D. C.

UNITED STATES PATENT OFFICE.

ÆTNA MANUFACTURING COMPANY, OF SALEM, OHIO, ASSIGNEES OF AMOS RANK.

IMPROVEMENT IN HARVESTERS.

Specification forming part of Letters Patent No. 61,953, dated February 12, 1867; Reissue No. 3,627, dated August 31, 1869.

*To all whom it may concern:*

Be it known that I, AMOS RANK, of Salem, in the county of Columbiana and State of Ohio, have invented new and useful Improvements in Reaping and Mowing Machines, of which the following is a full, clear, and exact description.

The invention herein claimed relates to that class of combined reaping and mowing machines in which the inner or heel end of the finger-beam is secured to the rear end of a drag-bar arranged longitudinally relatively to the path of the machine, and pivoted at its forward end to an eyebolt turning in a socket connected with the main frame, by which means the drag-bar is free to turn axially in its socket, and also to rise and fall bodily, without affecting the movements of the frame, thus enabling the cutting apparatus freely to conform to the surface over which it slides.

In the class of machines above mentioned, when adjusted for mowing, the crank-pin, the pitman, and the eye of the cutter-bar usually lie in substantially the same vertical plane. When, however, the cutting apparatus is raised for reaping the drag-bar causes the heel end of the finger-beam to rise in the arc of a circle of which the eyebolt of the drag-bar forms the center, and, as the crank-pin remains in its former position, the eye of the cutter-bar is necessarily carried backward out of the plane of the crank-pin, in consequence of which change of position the cutters and pitman are apt to become bound and to work hard.

Now, the object of the invention herein claimed is to overcome the difficulty thus caused, which difficulty has been found in practice to be a serious one, to which end my improvement consists in the application to the swivel connecting-pin at the forward end of the drag-bar of a collar or gage of such determined length that when placed in rear of the socket on the eyebolt the cutting apparatus will be adjusted and held to its proper position relatively to the crank-pin and pitman for mowing, and when placed in front of the socket the parts will be adjusted to the proper position for reaping, whereby I am enabled to secure the requisite adjustments with unerring certainty and without measurement simply by changing the position of the collar.

In the accompanying drawings, which make part of this specification, Figure 1 represents a plan or top view of so much of a harvesting-machine embracing my improvement as is necessary to illustrate the invention herein claimed, showing the relative position of the parts when adjusted for reaping. Fig. 2 represents a similar view of the same as adjusted for mowing. Fig. 3 represents a view in elevation of the same as seen from the divider side, the red lines showing the altitude assumed by the parts when mowing and the black lines their position when reaping. Fig. 4 represents a vertical longitudinal section through the socket and collar, showing their relation to the eyebolt or connecting-pin, to which the front end of the drag-bar is pivoted.

In the accompanying drawings a main frame, A, is shown as supported on an axle on which wheels B are mounted. The finger-beam L is suitably connected with a drag-bar, C, the front end of which is is pivoted to an eyebolt, *a*, which turns freely in a bearing or socket, *g*, projecting from the main frame. In this instance the finger-beam is shown as hinged to the drag-bar. This bolt *a* should be made of a length so much greater than that of the bearing *g* as to receive a collar, *h*, and also a nut to retain the bolt in its socket. When mowing the collar *h* is arranged on the eyebolt between its eye and the socket *g*, as shown in Fig. 2 and in red lines in Fig. 3. When the parts are in this position the crank-pin, cutter, and the pitman are all in the same vertical plane and will work smoothly. When the cutting apparatus is raised to adapt it to reaping the collar *h* is removed from behind the socket and placed in front of it, the drag-bar, cutting apparatus, and eyebolt being moved forward a distance equal to the length of the collar, as shown in black lines in Figs. 1 and 3. By inspecting Fig. 3 it will be seen that in either position the crank-pin, the cutter, and the pitman always remain in the same vertical plane, whether adjusted up or down, and consequently there will be no binding of the joints or other parts.

I am aware that drag-bars heretofore have been adjusted by means of a nut and screw; but I am not aware that a gage-collar has been so used in connection with such adjusting device as to determine the proper adjustment of the cutting apparatus for either reaping or mowing by its arrangement on the eye, adjusting-pin, or swivel-connection relatively to its socket, as in my device, by means of which the most inexperienced hand is enabled readily to change the machine from a reaper to a mower.

What I claim as my invention, and desire to secure by Letters Patent, is—

1. The combination, in a harvester, of a bearing projecting from the main frame, a swiveling eyebolt working in the bearing, and a gage-collar fitting on the eyebolt and changeable from one side of the socket to the other, the combination being and operating substantially as set forth.

2. The combination, in a harvester, of a fixed bearing or socket, a changeable gage-collar, a longitudinally-adjustable eyebolt and a vibrating drag-bar with a hinged cutting apparatus, the combination being and operating substantially as set forth.

In testimony whereof I have hereunto subscribed my name.

AMOS RANK.

Witnesses:
C. W. CADWALLADER,
SAML. T. STREET,
THOS. S. BOND.